Figure 1:
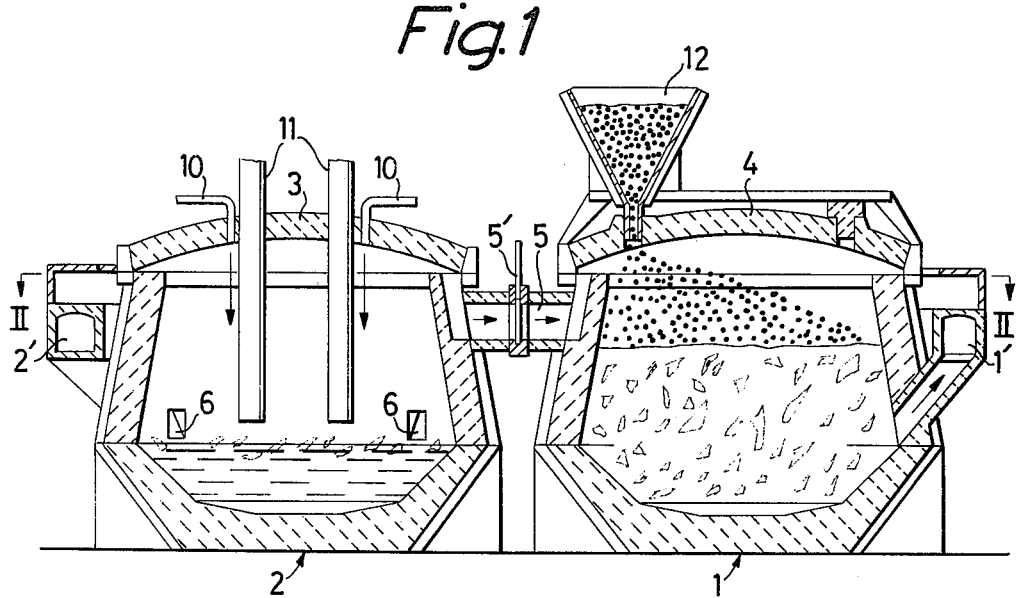

United States Patent [19]

Tiberg

[11] 3,887,360

[45] June 3, 1975

[54] METHODS AND FURNACES FOR STEEL MANUFACTURE BY DIRECT REDUCTION AND MELTING OF IRON ORE

[75] Inventor: Magnus Gustav Georg Tiberg, Hallefors, Sweden

[73] Assignee: Aktiebolaget Svenska Kullagerfabriken, Gothenburg, Sweden

[22] Filed: July 19, 1972

[21] Appl. No.: 273,225

Related U.S. Application Data

[63] Continuation of Ser. No. 21,873, March 23, 1970, abandoned.

[30] Foreign Application Priority Data

Mar. 26, 1969 Sweden.............................. 4267/69

[52] U.S. Cl. .......................... 75/46; 75/13; 75/38; 75/40
[51] Int. Cl. ....................... C21b 11/00; C21b 11/10
[58] Field of Search ........................... 75/10–13, 38, 75/40, 43, 26, 34, 46

[56] References Cited
UNITED STATES PATENTS

| | | | |
|---|---|---|---|
| 1,489,361 | 4/1924 | Moxham | 75/38 |
| 2,035,550 | 3/1936 | Karwat | 75/38 |
| 2,107,980 | 2/1938 | Elian | 75/38 |
| 2,805,930 | 9/1957 | Udy | 75/11 |
| 2,894,831 | 7/1959 | Old | 75/13 |
| 2,940,744 | 6/1960 | Swenson | 75/43 |
| 3,063,826 | 11/1962 | Cavanagh | 75/38 |
| 3,140,168 | 7/1964 | Halley | 75/26 |
| 3,145,094 | 8/1964 | Nakajima | 75/38 |
| 3,163,520 | 12/1964 | Collin | 75/11 |
| 3,163,521 | 12/1964 | Rinesch | 75/38 |
| 3,193,378 | 7/1965 | Peet | 75/35 |
| 3,224,871 | 12/1965 | Collin | 75/11 |
| 3,353,807 | 11/1967 | Sixel | 75/40 |

FOREIGN PATENTS OR APPLICATIONS

828,314  2/1960  United Kingdom.................... 75/26

*Primary Examiner*—L. Dewayne Rutledge
*Assistant Examiner*—Peter D. Rosenberg
*Attorney, Agent, or Firm*—Fred Philpitt

[57] ABSTRACT

Improvements in method and apparatus for manufacturing and melting of iron from dressed ore or pellets, carried out in two steps, wherein the first step is a pre-reduction step in which reduction is made by a reduction gas passed through a pellet layer or contacted a flow of dressed ore said gas then being passed through a gas-permeable meltable charge and drawn off, and the second step is a melting and final reduction step in which pre-reduced charge is melted as known per se and finally reduced for further steel manufacture.

9 Claims, 2 Drawing Figures

METHODS AND FURNACES FOR STEEL MANUFACTURE BY DIRECT REDUCTION AND MELTING OF IRON ORE

This is a continuation of application Ser. No. 21,873, filed Mar. 23, 1970, and now abandoned.

The present invention relates to improvements in method and apparatus for manufacturing of steel by direct reduction and melting of iron ore in the form of finally dressed ore or balls or pellets made therefrom, said method being carried out in two steps.

Several methods for reduction of iron ore are previously known such as the so-called Hoganas method in which iron ore concentrate and carbon are packed into capsules which are heated or the so-called Wiberg-38derfors method, in which the reduction of ore is carried out with gas, substantially carbon monoxide, said reduction gas being circulated and carburated in a carburettor. The reduction of the iron ore with a gas mixture of CO and $H_2$ is advantageous from many respects.

In reduction of iron ore it must be taken into consideration in shaft furnaces and also other kinds of furnaces, such as rotary furnaces, the hazard of cladding, i.e., the burning-together of the material. Therefore the temperature may not be allowed to exceed a certain maximum level during the reduction. The highest temperature which can be used during the reduction is dependent upon the kind of ore and other conditions but exceedes seldom 1000°C. Said method of cladding of course has influence upon the reaction speed and thus the production and is a serious drawback in all reduction of iron ore (except capsule processes). Furthermore the reduced iron ore, which is manufactured non-capsuled, must be cooled below a certain temperature since sponge iron formed in the reduction in pyrophorous. Said character of the sponge iron is a further drawback and it must be taken into consideration the hazard of re-oxidation and the reduced iron ore be stored in gas-tight containers or stored in any other way so that self-ignition does not occur. Also this circumstance complicates the manufacture of reduced iron ore according to hitherto known methods and makes same more expensive.

The main object of the present invention is thus to minimize the above-stated drawbacks. This is achieved according to present invention in that the first method step is a pre-reduction step in which the iron ore is reduced by leading a reduction gas through a layer of such balls or pellets or bringing said gas into contact with a flow of continuously charged finely dressed ore and then passing, at least partially, said gas through a gas-permeable meltable charge, e.g. of scrap iron or partially sintered pellets, after which the gas is carried away, e.g. to a waste gas boiler, and in that the second step is a melting and final reduction step in which the pre-reduced charge without previous decrease of the temperature below the value for reoxidation is melted as known per se and finally reduced for further steel manufacture.

This now allows achieving of a very economical and advantageous process. Particularly said process is well suited for being carried out in a furnace having two furnace bodies or preferably in a so-called twin furnace, e.g. of the kind previously known from e.g. the British patent specification 1,010,645 and the U.S. Pat. No. 3,379,815. In said specifications, the furnace structure is adapted to be used for pre-heating of the charge in one of the furnaces while melting of the charge with oxygen gas and oil and melting with electrodes or heat supply with electrodes is going on in the other furnace body. According to the present invention, however, the twin furnace is most preferably designed in a particular way.

When using a twin furnace with a gas pipe connecting the furnaces, it is namely possible to carry out a particularly advantageous embodiment of the method, substantially being distinguished in that the pre-reduction step is carried out in one of the furnace bodies while melting and final reduction and the further steel manufacture is carried out in the other furnace body, after which when the process has been completed the furnace bodies change their function so that the furnace body utilised for the melting and final reduction step after tapping and fettling, if required is utilized to the pre-reduction step while the pre-reduced charge in the other furnace body is subjected to melting and final reduction.

Figure 2:
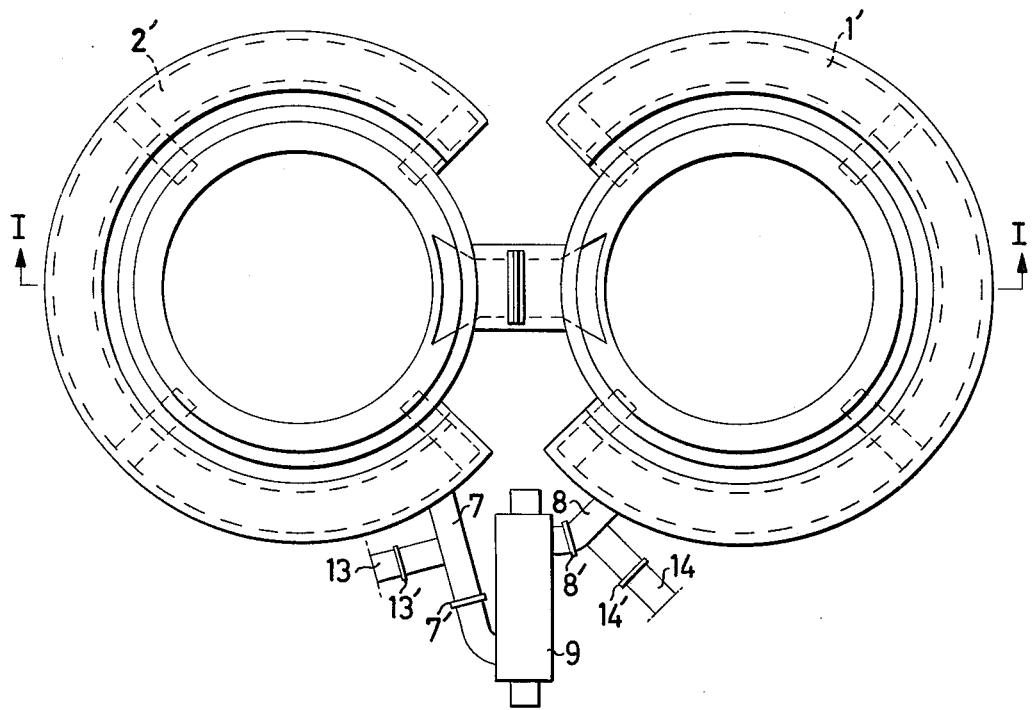

By the way of example, the method according to the invention will be further described below applied in a twin furnace and with reference to the enclosed drawings in which FIG. 1 is a longitudinal elevational view in section of the twin furnace and FIG. 2 is a plan view of said twin furnace. The twin furnace utilized in the present invention is an arc furnace with two non-tiltable furnace bodies 1 and 2, respectively. To the furnace bodies 1 or 2 is associated an electrode arch 3 which can be mounted on either furnace. Furthermore there is an electrode-free arch 4 which can be mounted alternately on the furnace 2 or 1 independently of the arch 3.

The furnace bodies 1 and 2 are provided with small apertures in the walls for inspection, sampling and blowing with a lance. Immediately above the slag level are gas exhaust openings 6 which lead to annular channels 1' and 2'. Said two annular channels are provided each with a flue gas pipe 7, 8, which in turn are provided each with a branch pipe 13, 14, leading direct to a waste gas heat boiler (not shown). In each of said four gas pipes there is a throttle 7', 8', 13', 14', and between the gas pipe 7 and 8 is connected a fan device 9. From said boiler leads a flue gas pipe (not shown) to filtering device and exhaust fan. The upper portions of the twin furnaces are furthermore connected with each other through a gas pipe 5 provided with a throttle 5'. On the electrode arch 3 there are devices 10 for supply of compounds, from which reduction gas is to be generated so that the supply occurs along the electrodes 11.

Thus one furnace 2 can be utilized for carrying out the final reduction and melting step during simultaneous generation of reduction gas, while the other furnace 1 serves as pre-reduction furnace and pre-heating furnace for the scrap iron charge. Then the function of the furnaces can be interchanged. Gas from the melting furnace 2 is passed through the channel 5 over the charge in the reduction furnace 1, is passed downwardly through said charge and is drawn out through the gas exits 6 above the slag level and into the annular channel 1'. A part of the leaving gases then can be carried back through the gas pipe 8, the fan device 9 and the gas pipe 7 to the melting furnace for creation of further reduction gas. The remainder of the leaving gases is carried away through the gas pipes 8, 14 directly to the boiler where they are combusted. The iron ore either can be directly introduced into the gas flow between the furnaces in the form of finely dressed ore through hopper 12 in the electrode arch 4 or charged on the top of the charge as a top layer in the form of pellets, the reduction gas passing through the pellets.

Since it is extremely advantageous to let finely dressed ore meet the reduction gas coming from the melting furnace, this method will be described more in detail below.

As previously mentioned the reduction gas can be generated in the melting furnace by injecting in said furnace a mixture of natural gas or lower alkanes but most preferably LPG ($C_3H_8$) and steam during melting and then preferably between the electrodes and the furnace wall. At the high temperature residing in the arch, the reaction will be $C_3H_8 + 3H_2O = 3CO + 7H_2$. Thus there is obtained a reduction gas generally containing 30 percent CO and 70 percent $H_2$. Due to the high temperature in the melting furnace said gas will leave said furnace with high temperature, at the end of the melting step temperatures up to between 1,200° and 1,500°C. When now finely dressed ore, if desired preheated up to 850°C (above said temperature the finely dressed ore will clad into the gas flow, the reduction will occur very rapidly and an iron powder or better a kind of iron fog is formed which will cladd to the furnace walls as well as to the charge in the reduction furnace.

In the method according to the invention it is preferable to manufacture only a certain percent of the charge in the form of iron from dressed ore such as 30 percent. The charge then will serve as a filter and the fine iron fog will clad to the charge which is required for carrying out the process. Otherwise the iron fog would be entrained through the gas exits and clog same.

After the gas has been utilized for reduction of the finely dressed ore, said gas is passed, as mentioned, through the charge and heats same while being cooled. Owing to this a great portion of the physical heat of the reduction gas will be collected for heating the charge so that the melting then can be carried out faster with smaller energy consumption when the reduction furnace is utilized as melting furnace.

In a twin furnace plant having 60 tons charge weight each furnace has a volume of 70 m$^3$ and the cross-sectional area of the upper portion of each furnace body is 17.5 m$^2$. The melting furnace effect is 25 MVA. In such a plant the reduction of 19 ton iron is calculated to require one hour. The consumption of liquified petroleum gas (LPG) is calculated to 150 kgms per ton reduced iron with 90 percent reduction degree. The effect consumption is calculated to 700 kVh/ton reduced iron with 90 percent reduction degree and the charge time for both furnaces interconnected is calculated to 2 hours and 10 minutes.

The manufacture of a molten bath and the reduction of iron from iron ore concentrate is made in the following way. As soon as the melting furnace is tapped, which occurs in the same way as from an open-hearth furnace by pricking the electrode arch is pivoted over to the furnace in which the reduction and pre-heating is going on. After this the emptied furnace is fettled with a rotary fettling machine and the charging starts with heavy scrap iron in the bottom and lighter scrap thereabove until 45 ton scrap iron has been charged in said furnace. During this the throttle in the gas pipe between the two furnaces is closed and suction from the melting furnace is made directly through the exits of said furnace to the annular channel and the boiler. When fettling and charging is finished, the arch provided with means for feeding finely dressed ore is pivoted into a position above the reduction furnace. The throttle in the connecting pipe between the furnaces is opened and the remaining throttles are adjusted so that the gas from the melting furnace is drawn into the reduction furnace and through the exits into the boiler or back to the melting furnace. The finely dressed ore, which may be pre-heated up to 850°C, is fed into the reduction furnace in such a way that it meets the gas flow from the melting furnace. Before this, the supply of LPG and steam has started in the melting furnace. 27–28 tons finely dressed ore now is fed in one hour and continuously reduced in the hot gas flue and the reduction will continue since incompletely reduced ore will adhere to the charge therebelow. The reduction occurs as long as melting is going on in the melting furnace. When the charge is to be finished in the melting furnace, i.e., when C is to be removed in a refining process as known per se, when oxygen is to be introduced in the bath, analysis and temperature are to be adjusted, no supply of LPG and steam occurs. The gases formed during the finishing period consist substantially of CO and said gases can be passed into the reduction furnace for completing the reduction and keeping the charge heated. After finished tapping of the melting furnace, the procedure is repeated in reversed order.

What we claim is:

1. A method for the manufacture of steel from iron ore in a furnace plant including two furnace zones having arranged therebetween a connecting zone for transferring reducing gas, and which comprises:
   A. generating a reduced gas in a first furnace zone;
   B. said first furnace zone containing iron;
   C. charging scrap iron into a second furnace zone;
   D. continuously introducing finely dressed ore into said second furnace zone at the top of said second furnace zone;
   E. passing said reducing gas into said second furnace zone and intimately contacting said reducing gas with said finely dressed ore to partially reduce said finely dressed ore;
   F. then passing said reducing gas through the charge of scrap iron to remove fine particles of non-reduced iron ore entrained in said reducing gas and to bring particles of reduced iron to clad on the scrap iron charge;
   G. said iron in said first furnace zone being prereduced finely dressed ore and scrap iron prepared by above steps (C) to (F);
   H. melting and carrying out the final reduction of said iron in said first furnace zone;
   I. reversing the functions of the furnace zones; and
   J. repeating the process steps.

2. The method of claim 1 wherein the reducing gas is generated from a mixture of liquified petroleum gases and steam.

3. The method of claim 1 wherein said finely dressed ore is preheated up to 850° C before being introduced into said second furnace zone.

4. The method of claim 1 wherein the finely dressed ore is 30 percent by weight of the scrap iron and finely dressed ore charge in the second furnace zone.

5. The method of claim 1 wherein the drop of pressure of the reduction gas passing through the charge is compensated so that gas leakage from the furnace plant above the charge is eliminated.

6. The method of claim 1 wherein during the prereduction step, the temperature of the reduction gas, at least in the latter part of the reduction step, exceeds the temperature at which the reduced dressed ore clads, 7. The method of claim 1 wherein the reduction gas is generated by cracking natural gas or lower alkanes with steam.

8. The method of claim 1 wherein a portion of the gas obtained at the reduction and drawn away therefrom is recirculated to the final reduction and melting step for generation of further reducing gas and whereby the natural gas or lower alkane supply is increased and the steam supply is decreased.

9. The method of claim 8 wherein 2/3 of the gas drawn away is recirculated to the final reduction and melting step.

* * * * *